(12) United States Patent
Mintgen et al.

(10) Patent No.: US 7,066,310 B2
(45) Date of Patent: Jun. 27, 2006

(54) PISTON-CYLINDER UNIT

(75) Inventors: Rolf Mintgen, Thür (DE); Wilhelm Schwab, Neuwied (DE); Paul Muders, Rhens (DE); Frank Born, Dienethal (DE); Andre Stein, St. Goar-Werlau (DE)

(73) Assignee: Stabilus GmbH, Koblenz (DE)

( * ) Notice: Subject to any disclaimer, the term of this patent is extended or adjusted under 35 U.S.C. 154(b) by 0 days.

(21) Appl. No.: 10/627,326

(22) Filed: Jul. 25, 2003

(65) Prior Publication Data

US 2004/0134732 A1 Jul. 15, 2004

(30) Foreign Application Priority Data

Jul. 27, 2002 (DE) ................................ 102 34 355

(51) Int. Cl.
*F16F 9/04* (2006.01)
(52) U.S. Cl. .................................. 188/322.22; 188/298
(58) Field of Classification Search ........... 188/322.22, 188/298
See application file for complete search history.

(56) References Cited

U.S. PATENT DOCUMENTS

| | | | |
|---|---|---|---|
| 2,357,278 A * | 8/1944 | O'Connor | 188/269 |
| 2,788,867 A | 4/1957 | Causse | |
| 3,105,574 A * | 10/1963 | Frenzel et al. | 188/269 |
| 3,469,661 A * | 9/1969 | Lohr et al. | 188/269 |
| 3,625,321 A * | 12/1971 | Lutz | 188/298 |
| 4,271,938 A * | 6/1981 | Berger | 188/280 |
| 4,614,255 A * | 9/1986 | Morita et al. | 188/315 |
| 5,224,413 A * | 7/1993 | Herner | 188/322.22 |
| 5,386,892 A * | 2/1995 | Ashiba | 188/282.8 |
| 5,404,972 A * | 4/1995 | Popjoy et al. | 188/277 |
| 5,620,066 A | 4/1997 | Schüttler | |

FOREIGN PATENT DOCUMENTS

DE     914 086     6/1954

(Continued)

*Primary Examiner*—Robert A. Siconolfi
(74) *Attorney, Agent, or Firm*—Cohen, Pontani, Lieberman & Pavane

(57) ABSTRACT

A piston is guided in an axially displaceable manner sealed off from a closed cylinder via an annular seal radially surrounding it, and divides the cylinder interior into a working space near the piston rod and a working space away from the piston rod. The two working spaces are filled with a hydraulic fluid. The piston has a one-sided piston rod which extends through the working space near the piston rod and is guided in a sealed manner to the outside through an end closing wall of the cylinder. A first valve can be opened under high pressure to connect the working space away from the piston rod to the working space near the piston rod. A second valve can be opened under high pressure to connect the working space near the piston rod to the working space away from the piston rod. A volume-equalizing chamber for receiving the amount displaced from the working space away from the piston rod, which is greater than the amount displaced from the working space near the piston rod. The volume-equalizing chamber is arranged in the piston, and the working space away from the piston rod can be connected to the volume-equalizing chamber via the first valve and the working space near the piston rod can be connected to it via the second valve. The volume-equalizing chamber can be connected to the working space away from the piston rod via a first nonreturn valve and can be connected to the working space near the piston rod via a second nonreturn valve.

18 Claims, 14 Drawing Sheets

FOREIGN PATENT DOCUMENTS

| | | |
|---|---|---|
| DE | 44 31 626 A1 | 5/1995 |
| EP | 0 362 716 | 4/1990 |
| GB | 856 506 | 12/1960 |
| GB | 987 111 | 3/1965 |
| SU | 1 783 191 | 12/1992 |

* cited by examiner

PISTON-CYLINDER UNIT

BACKGROUND OF THE INVENTION

1. Field of the Invention

The invention is concerned with a piston-cylinder unit, having a closed cylinder in which a piston is guided in an axially displaceable manner sealed off from the cylinder via an annular seal radially surrounding it, and divides the cylinder interior into a working space near the piston rod and a working space away from the piston rod, the two working spaces being filled with a fluid, in particular with a hydraulic fluid. A one-sided piston rod extends through the working space near the piston rod and is guided in a sealed manner to the outside through an end closing wall of the cylinder. A first valve can be opened under pressure, in particular under high pressure, to connect the working space away from the piston rod to the working space near the piston rod. A second valve can be opened under high pressure to connect the working space near the piston rod to the working space away from the piston rod. A volume-equalizing chamber receives an amount of hydraulic fluid displaced from the working space away from the piston rod, which is greater than the amount displaced from the working space near the piston rod.

2. Description of the Related Art

A known piston-cylinder unit of this type has a volume-equalizing chamber which is arranged in an end region of the cylinder and is separated from the working space away from the piston rod by a partition. This design results in a large overall length and a high outlay on components for the piston-cylinder unit.

It is therefore the object of the invention to provide a piston-cylinder unit of the type mentioned at the beginning which makes a compact construction with fewer components possible.

SUMMARY OF THE INVENTION

According to the invention, the volume-equalizing chamber is arranged in the piston, and the working space away from the piston rod can be connected to the volume-equalizing chamber via the first valve, and the working space near the piston rod can be connected to it via the second valve, and in that the volume-equalizing chamber can be connected to the working space away from the piston rod via a first nonreturn valve and can be connected to the working space near the piston rod via a second nonreturn valve.

Since the cylinder can now be of shortened design and also the piston has at most only to be extended slightly, a very compact piston-cylinder unit is achieved. The integration of the volume-equalizing chamber in the piston furthermore results in a reduction in the components which are required and therefore also in a considerable reduction of costs for the piston-cylinder unit.

The piston-cylinder unit may be used, for example, as a shock absorber.

Another advantageous possibility is in the use as a door arrester which acts in an infinitely variable manner, in particular for a door of a motor vehicle.

So that the volume of the volume-equalizing chamber always corresponds to the volume of fluid which is to be received, it is possible for the volume of the volume-equalizing chamber to be increased under pressure loading and to be reduced under pressure relief.

One suitable design in this regard involves arranging a volume-equalizing element which reduces its volume under pressure loading and increases its volume under pressure relief in the volume-equalizing chamber.

In another suitable design of simple construction, the volume-equalizing chamber has a flexible wall designed, in particular, as an elastic diaphragm.

The first and/or the second valve, which can be opened under high pressure, can be a third and/or fourth force-loaded nonreturn valve, in which case, in a simple design, the first and/or second valve, which can be opened under high pressure, has a closing element which is loaded in the closing direction by a compression spring, in particular by a helical compression spring or a cup-type compression spring.

One possibility for the first and/or second valve is for the first and/or second valve, which can be opened under high pressure, to be a seat valve.

In the same manner, the first and/or second valve, which can be opened under high pressure, can advantageously be a slide valve.

For reliable guidance of the closing elements, the first and/or the second valve, which can be opened under high pressure, can have a valve chamber which is formed in the piston and in which a valve piston is guided displaceably in a sealed manner. The valve piston bears a closing element which is acted upon in the closing direction by a force and is acted upon in the opening direction by the pressure of one of the working spaces, and by means of which the valve passage of the first and/or second valve, which can be opened under high pressure, can be blocked.

In order, when the piston is at a standstill, to ensure closure of the first and/or second valve, the closing element or the valve piston can be acted upon in the closing direction by a spring.

This may take place by means of a helical compression spring.

Another possibility is for the closing element or the valve piston to be acted upon in the closing direction by a force from one or more spring arms which are supported on the piston and the force of which is degressive on the path of movement of the closing element or the valve piston in the opening position, at least in the last part of the path of movement, and is at least largely zero in the opening position. This has the advantage that, during displacement of the piston, the closing element or the valve piston remains in its open position, and, in particular if the piston moves slowly, a fluttering movement of the closing element does not occur.

Another possibility for acting upon the closing element or the valve piston with force is for the closing element or the valve piston to be acted upon in the closing direction by magnetic forces. In this case too, the closing force drops rapidly and sharply after the closing element is opened.

This is achieved in a simple manner in that a permanent magnet is arranged on the valve piston or the piston, and a ferromagnetic component is arranged on the piston or valve piston opposite the permanent magnet in the direction of movement of the valve piston.

In order to reliably retain the closing element in its open position during the displacement process, it is possible for the closing element or the valve piston to be retained in the opening position of the first and/or second valve with a retaining force which is smaller than the oppositely directed closing force, but added to a pressurization of the valve is larger.

One advantageously constructed possibility is for the valve piston or the piston to be able to be latched in the opening position with a latching element into a latch on the piston or the valve piston, and for the force for unlatching the latching element from the latch to be the retaining force.

Finally, it is also possible for a snap spring which is supported with the free end of its snap arm on the piston to be arranged on the piston, the snap arm being in contact with the piston in the axial direction at least largely without any force in the closed position of the valve piston and, in the opening position of the valve piston, acting upon the piston, thus producing the retaining force.

To reinforce the closing force, on the side facing away from the closing element it is possible for a permanent magnet to be arranged on the valve piston and, facing said permanent magnet, for a further permanent magnet to be arranged on the piston, said permanent magnets butting against each other.

An integration of functions saving on construction space and components is produced if the annular seal of the piston is designed such that it forms the first and the second nonreturn valve.

In a simple manner, it is possible for this purpose for the annular seal to have two annular sealing lips at an axial distance from each other, of which the free end regions, which bear against the inner wall of the cylinder, are directed away from each other, and for the volume-equalizing chamber to be connected to the space between the annular sealing lips via a connecting line, it being possible for the annular sealing lips to be two separate components or else connected to each other in their foot region.

Another, likewise simple possibility consists in that the annular seal of the piston has a sealing ring which bears elastically against the inner wall of the cylinder and on whose foot region, which is arranged on the piston, valve flaps which extend away axially in opposite directions are integrally formed, said valve flaps being able to be used to close connecting lines which open radially on the piston into the cylinder and lead to the volume-equalizing chamber.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
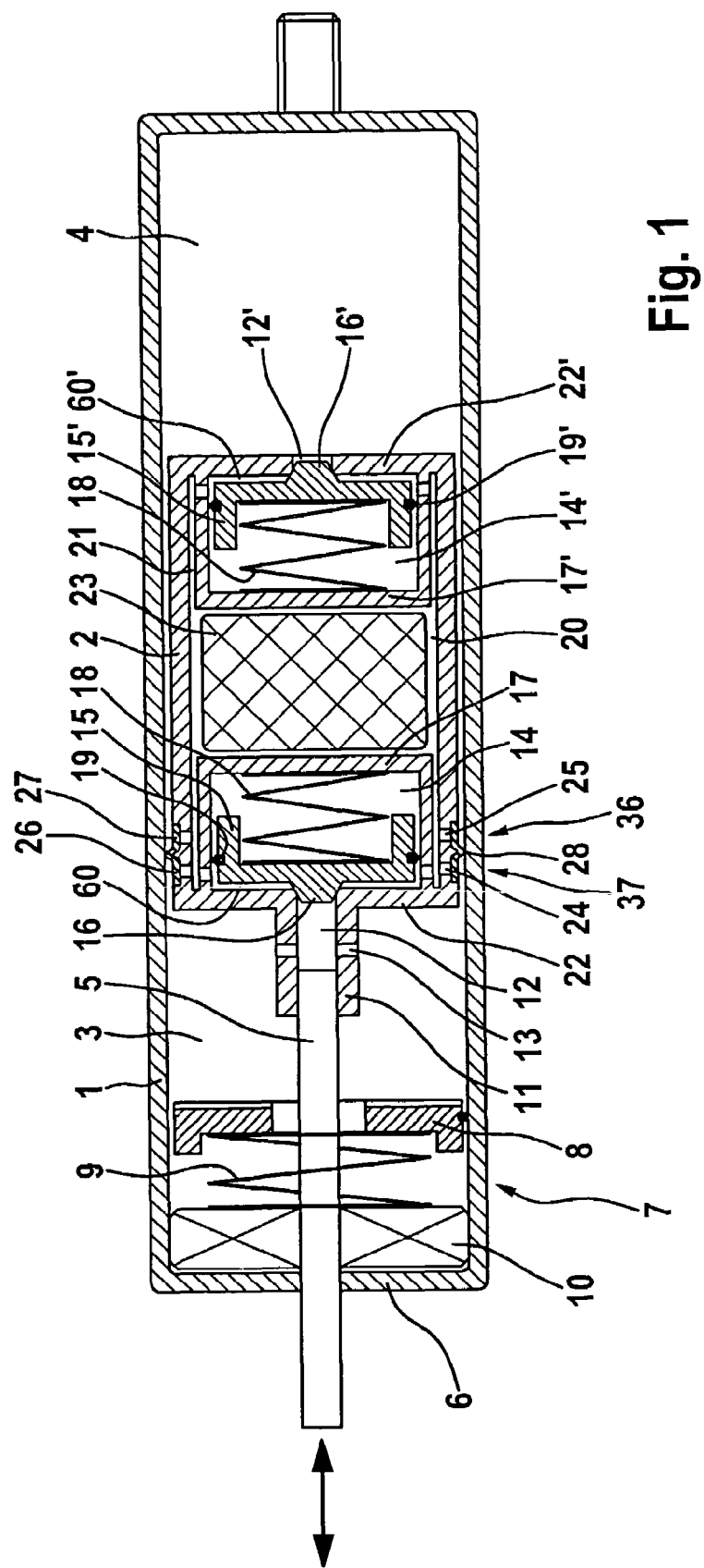
FIG. 1 shows a cross section of a first exemplary embodiment of a piston-cylinder unit.
Figure 2:
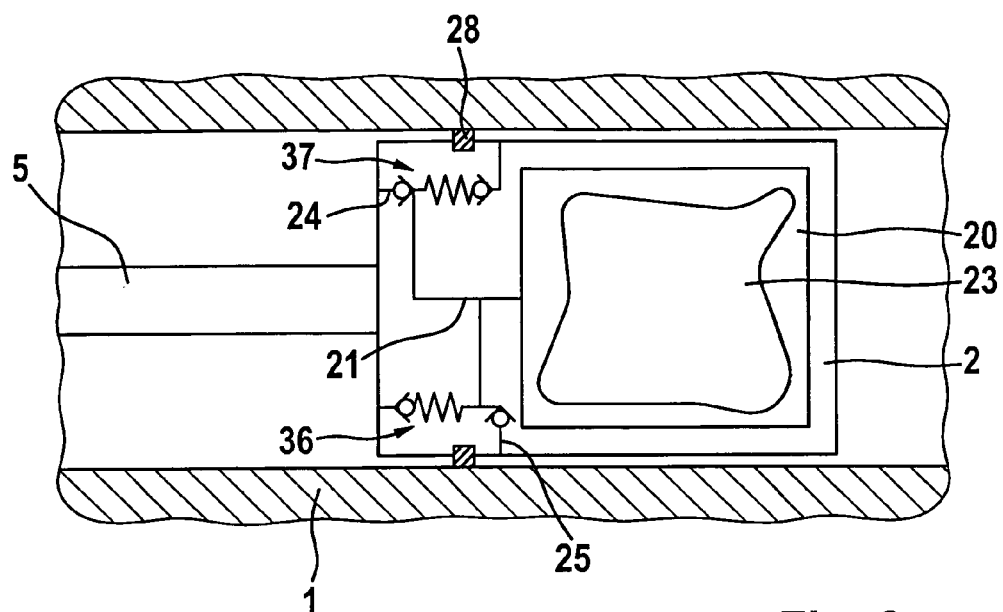
FIG. 2 shows a symbolic cross-sectional view of a second exemplary embodiment of a piston-cylinder unit.
Figure 3:
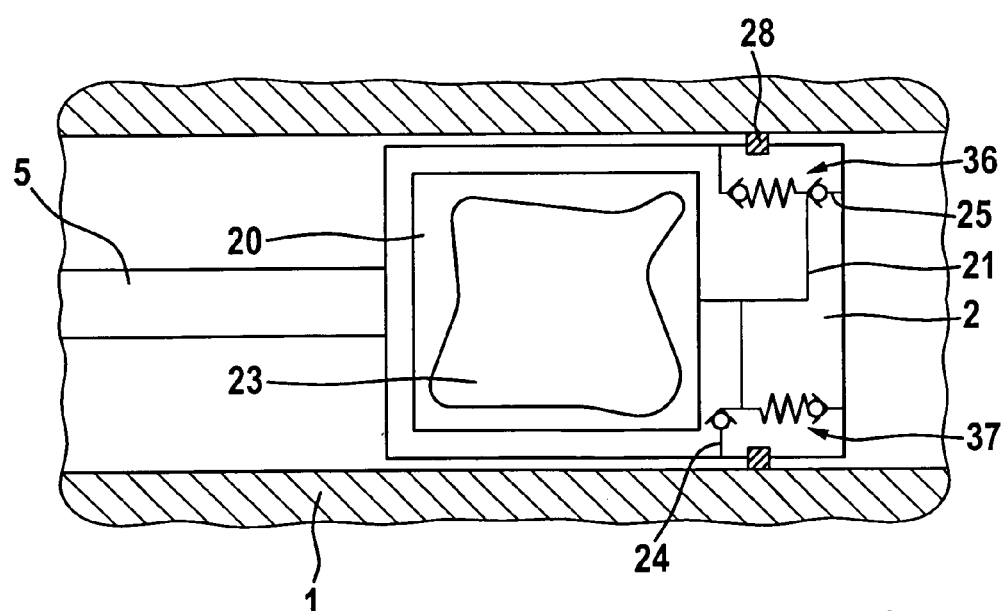
FIG. 3 shows a symbolic cross-sectional view of a third exemplary embodiment of a piston-cylinder unit.
Figure 4:
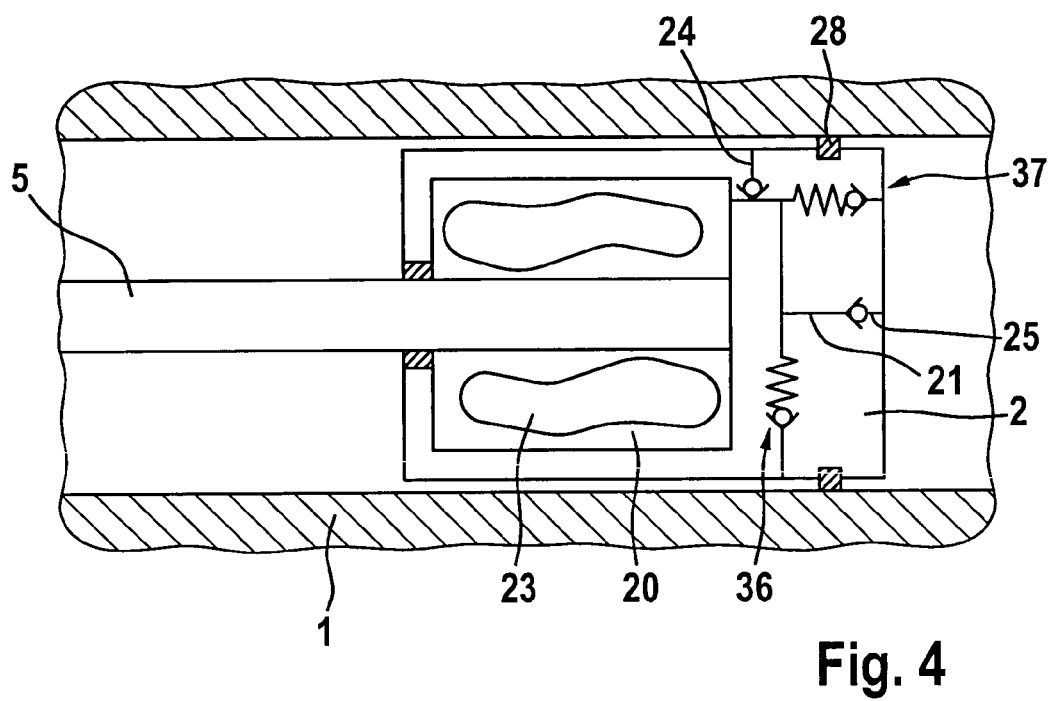
FIG. 4 shows a symbolic cross-sectional view of a fourth exemplary embodiment of a piston-cylinder unit.
Figure 5:
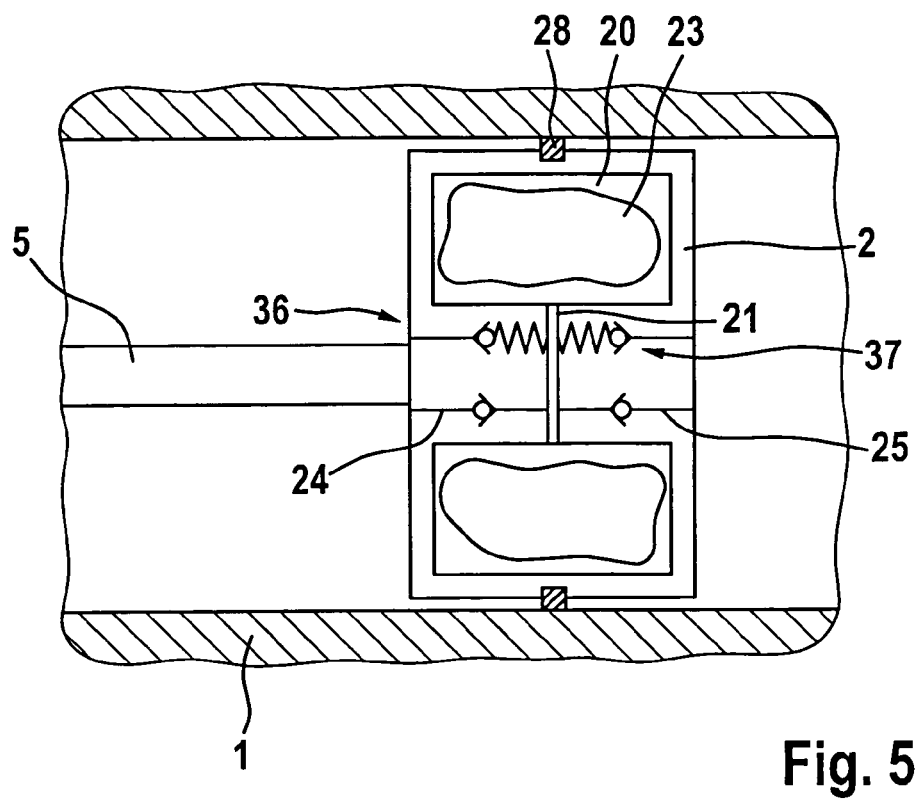
FIG. 5 shows a symbolic cross-sectional view of a fifth exemplary embodiment of a piston-cylinder unit.
Figure 6:
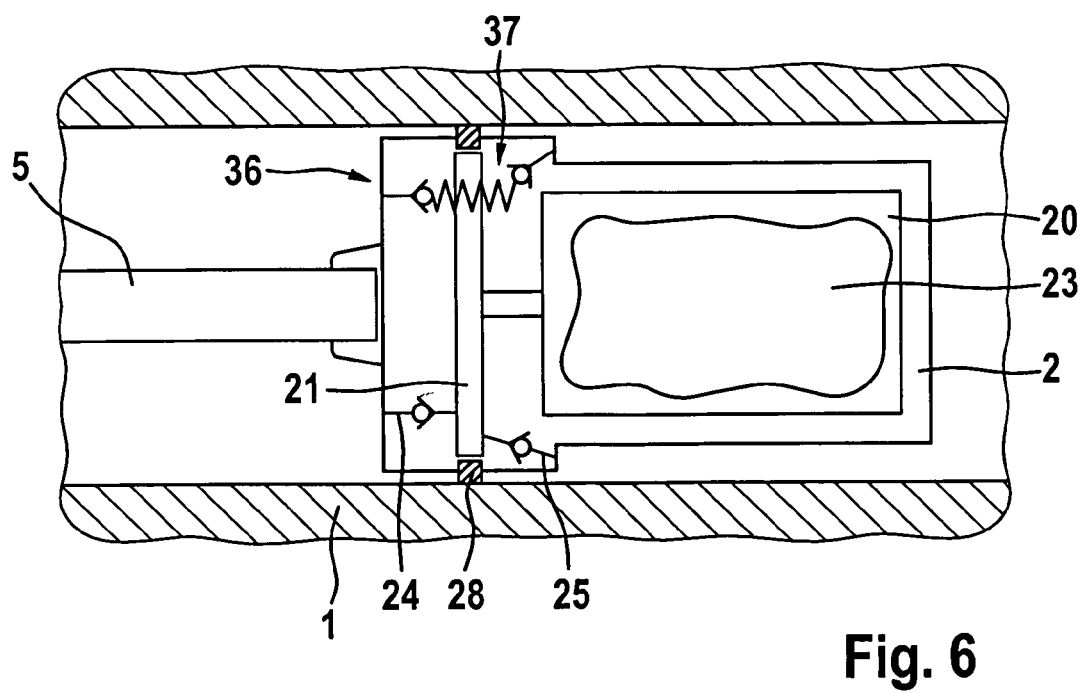
FIG. 6 shows a symbolic cross-sectional view of a sixth exemplary embodiment of a piston-cylinder unit.
Figure 7:
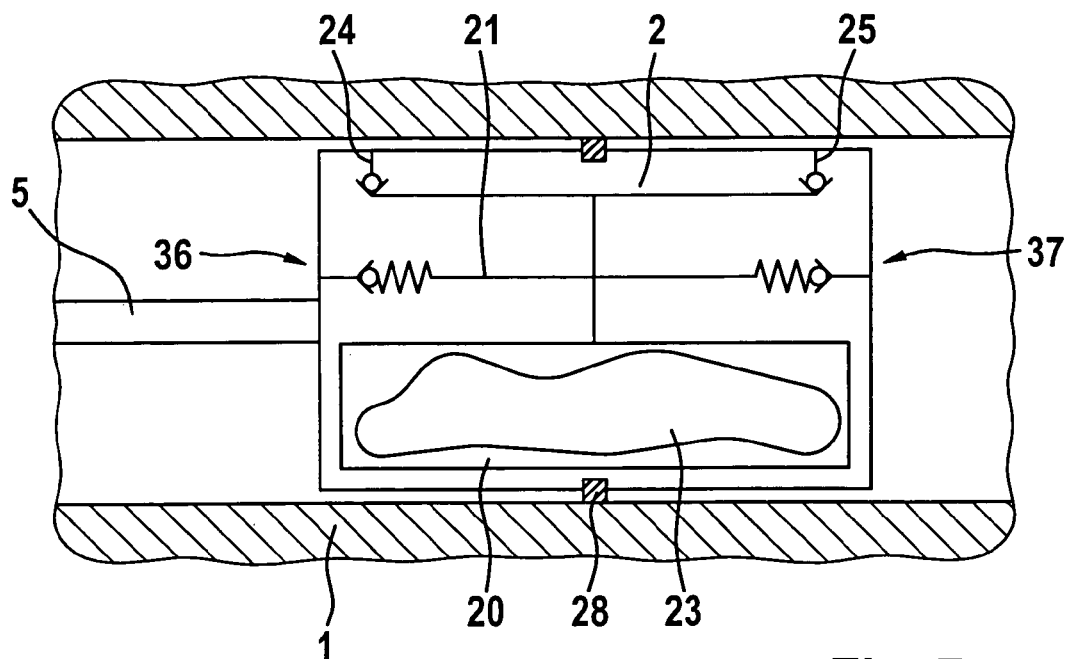
FIG. 7 shows a symbolic cross-sectional view of a seventh exemplary embodiment of a piston-cylinder unit.
Figure 8:
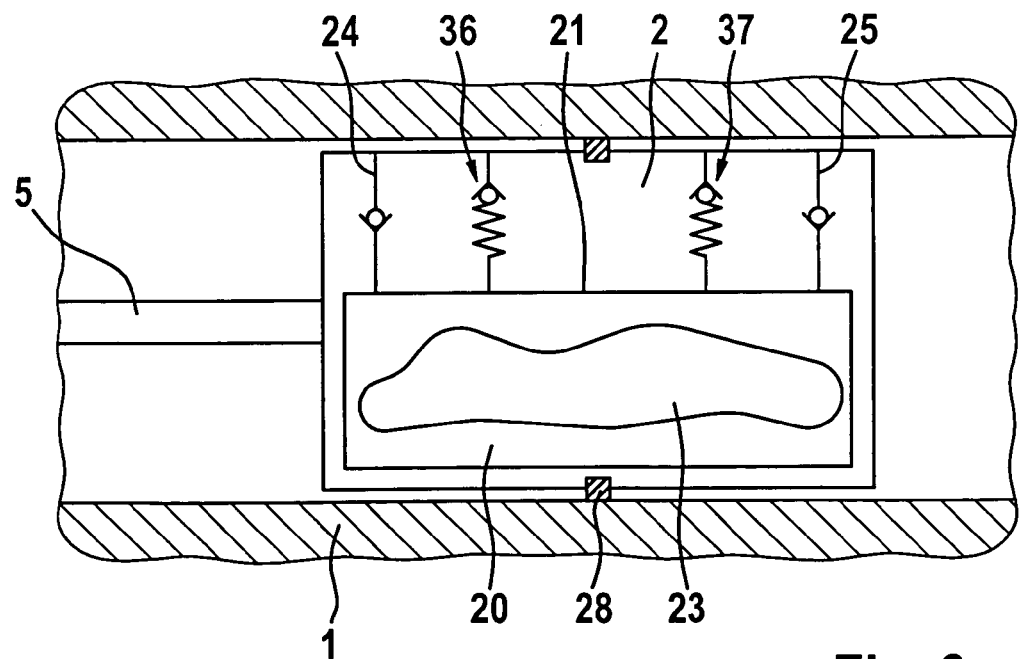
FIG. 8 shows a symbolic cross-sectional view of an eighth exemplary embodiment of a piston-cylinder unit.
Figure 9:
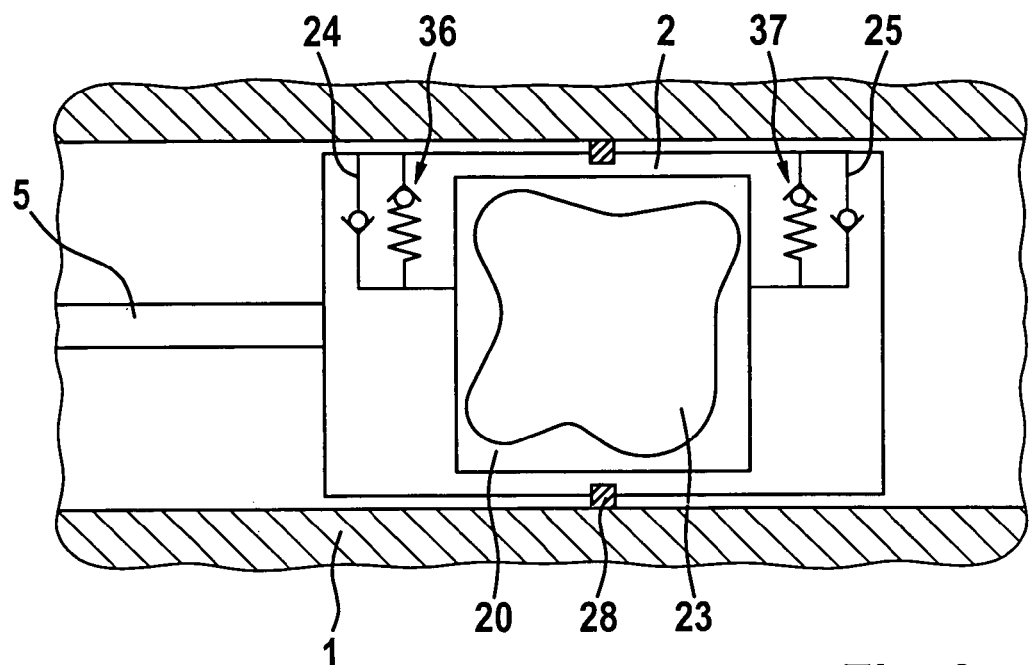
FIG. 9 shows a symbolic cross-sectional view of a ninth exemplary embodiment of a piston-cylinder unit.
Figure 10:
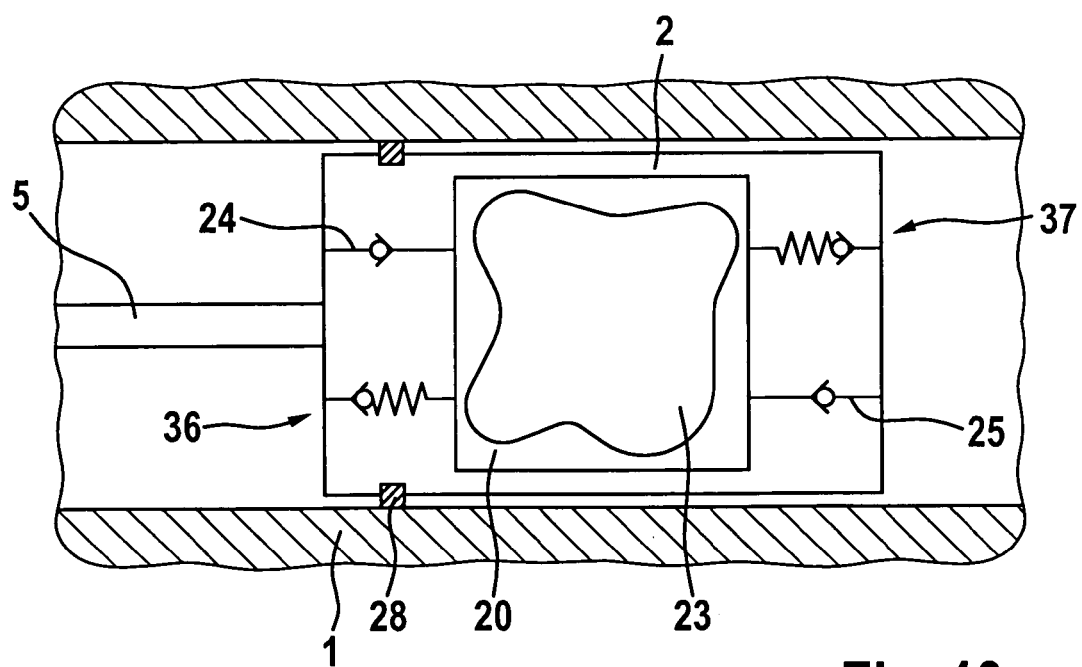
FIG. 10 shows a symbolic cross-sectional view of a tenth exemplary embodiment of a piston-cylinder unit.
Figure 11:
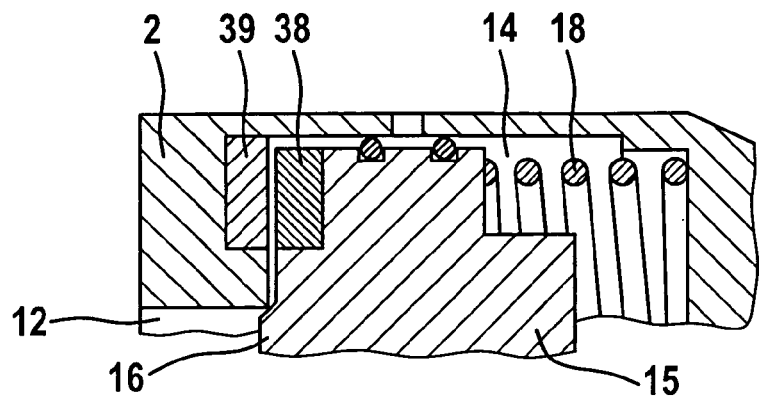
FIG. 11 shows a symbolic cross-sectional view of an eleventh exemplary embodiment of a piston-cylinder unit.

The piston-cylinder units illustrated in the figures are door arresters, which act in an infinitely variable manner, for motor vehicles. They have a closed cylinder 1 in which a piston 2 is guided in a displaceable manner, the piston dividing the interior of the cylinder 1 into a working space 3 near the piston rod and a working space 4 away from the piston rod. The two working spaces 3 and 4 are filled with oil.

A piston rod 5 is arranged on one side of the piston 2 and extends through the working space 3, and is guided in a sealed manner to the outside through a seal 10 and through an end closing wall 6 of the cylinder 1.

Arranged adjacent to the closing wall 6 in the working space 3 is an end position damping means 7 comprising a damping piston 8, which can be freely displaced axially in the working space 3, and a compression spring 9, which is arranged between the damping piston 8 and the closing wall 6.

In order to fasten the piston rod 5 to the piston 2, the latter has a coaxially protruding projection 11 with a coaxial hole 12, into the mouth of which the piston rod 5 is inserted fixedly with its one end.

Two radial holes 13 open into that region of the coaxial hole 12 which is nearer the piston 2 and to which the piston rod 5 does not reach, and connect the coaxial hole 12 to the working space 3.

At the piston end, the coaxial hole 12 opens into a valve chamber 14 which is formed in the piston 2 and in which a valve piston 15 is arranged in an axially displaceable manner and sealed by a seal 19 radially surrounding it. The valve piston 15 is provided with a closing element 16 which is the closing element of a seat valve and lies coaxially opposite the mouth of the coaxial hole 12 into the valve chamber 14, which mount is designed as a valve seat. A helical compression spring 18 which is supported on the bottom 17 of the valve chamber 14 causes the valve piston 15 to act with its closing element 16 against the mouth of the coaxial hole 12, closing it.

With the exception of the projection 11, that side of the piston 2 which faces the working space 4 is constructed in precisely the same manner as the side which faces the working space 3, and the corresponding components are provided with the reference numbers 12', 14', 15', 16', 17', 18' and 19'.

Between the two bottoms 17 and 17', a volume-equalizing chamber 20 is formed in the piston 2, the chamber being connected permanently via a first connecting line 21 to the spaces 60 and 60' formed between the valve pistons 15 and 15' and the respective end walls 22 and 22' of the piston 2.

A volume-equalizing element 23 which reduces its volume under pressure loading and increases it under pressure relief is arranged in the volume-equalzing chamber 20.

From the first connecting line 21, two connecting lines 24 and 25, which are formed at a distance from each other in the direction of longitudinal extent of the piston 2, lead radially outwards and open on the radially encircling circumferential surface of the piston 2. The mouths of the connecting lines 24 and 25 leading into the gap between the radially encircling circumferential surface of the piston 2 and the inner wall for the cylinder 1 can be closed by elastic valve flaps 26 and 27 of the first and second nonreturn valves 36 and 37.

At their mutually facing ends, the valve flaps 26 and 27 are connected integrally to a sealing ring 28 which radially surrounds the piston 2 in the region between the connecting lines 24 and 25. The working spaces 3 and 4 are separated from each other by the sealing ring 28.

When the piston rod 5 is not subjected to a load, all of the valves are closed and the piston 2 is retained in its position at that particular instance. If a compressive force is exerted on the piston rod 5, the piston 2 moves into the working space 4. The oil pressure produced in the process acts on the closing element 16' and lifts the latter off from its valve seat counter to the force of the helical compression spring 18'. Since the oil pressure now acts on the large surface of the valve piston 15', the latter moves rapidly into its left-hand end position. Furthermore, the oil displaced from the valve chamber 14' is conveyed via the connecting lines 21 and 24 and the opening valve flap 26 into the valve chamber 14, which increases in size. Since the increase in size of the working space 3 on the basis of the volume of the piston rod 5 is smaller than the reduction in size of the working space 4, the excess oil is received by the volume-equalizing chamber 20 with the volume of the volume-equalizing element 23 being reduced.

At the end of the action of the compressive force on the piston rod 5, all of the chambers again become unpressurized and all of the valves close.

In the case of an extension movement of the piston rod 5, the same procedure takes place in the reverse direction, oil not only flowing out of the working space 3 via the connecting lines 21 and 25 and the opening valve flap 27, but also the expansion of the volume-equalizing element 23 causing oil to flow out of the volume-equalizing chamber 20 into the working space 4.

FIGS. 2 to 15 illustrate the wide variety of arrangements of the lines 21, 24 and 25, arrangements of the nonreturn valves 36 and 37 and arrangements of the volume-equalizing chamber 20 in the piston 2, the function of these parts corresponding to the function in FIG. 1.

FIGS. 11 to 15 show special refinements of the valve piston 15 and the manner in which it is acted upon by a force. Thus, in FIGS. 11 and 12, an annular permanent magnet 38 is arranged on the valve piston 15 and a corresponding ferromagnetic component 39 is arranged opposite it on the piston 2. As a result, the piston 15 is retained in its closed position by a high force which drops sharply even after a small movement in the opening direction and thus ensures that the valve is definitely opened. The actual loading for closing purposes takes place by means of the helical compression spring 18.

Figure 12:
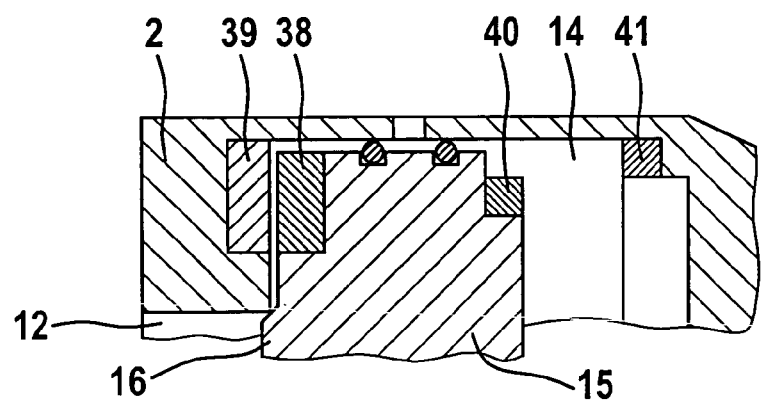
FIG. 12 shows a symbolic cross-sectional view of a twelfth exemplary embodiment of a piston-cylinder unit.

In the case of the exemplary embodiment of FIG. 12, there is no helical compression spring 18. In this case, the loading for closing purposes also takes place by means of the forces of attraction between the permanent magnet 38 and the ferromagnetic component 39.

In addition, the loading for closing purposes is also increased by two annular permanent magnets 40, 41. In this case, the permanent magnet 40 is arranged on the valve piston 15, at its end which faces away from the closing element 16, and the further, annular permanent magnet 41 is arranged axially opposite it on the bottom of the valve chamber 14. The repulsion forces of the permanent magnets 40, 41, which are arranged with identical poles facing each other, produce the additional loading for closing purposes.

Figure 13:
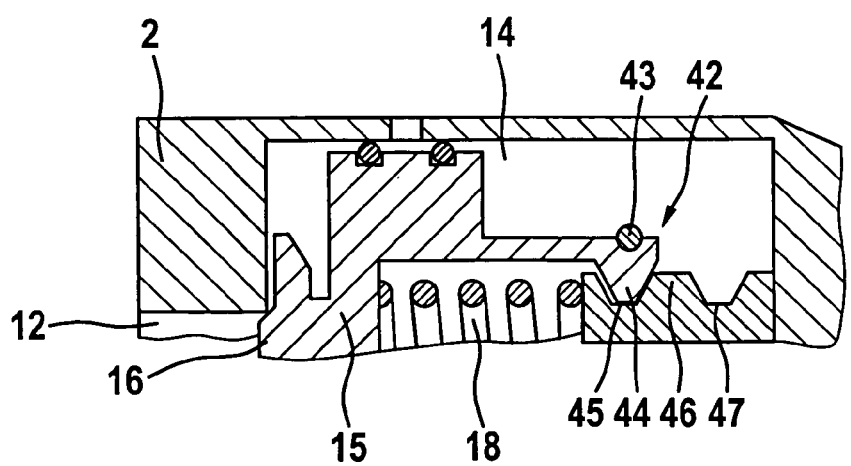
FIG. 13 shows a symbolic cross-sectional view of a thirteenth exemplary embodiment of a piston-cylinder unit.

In FIG. 13, latching hooks 42 are arranged on the valve piston 15 and are prestressed radially inwards by a spring strip 43. In the closed position of the valve piston 15, the latching hook 42 engages with its latching lug 44 in a right-hand latch 45. During opening of the valve, the latching lug 44 is lifted over a bulge 46 and latches in a left-hand latch 47. The unlatching force which is to be overcome in the reverse movement forms a retaining force which is used to retain the valve piston 15 in its open position.

Figure 14:
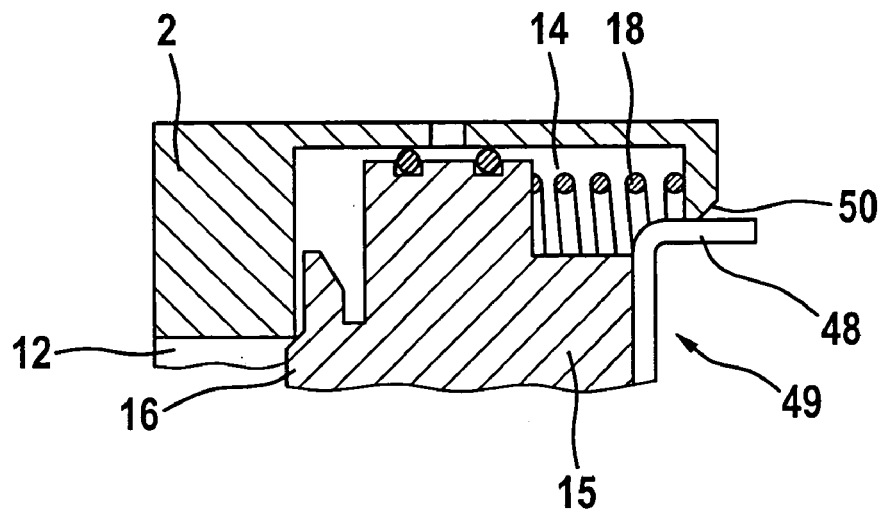
FIG. 14 shows a symbolic cross-sectional view of a fourteenth exemplary embodiment of a piston-cylinder unit.

In FIG. 14, a retaining force of this type is exerted by a snap arm 48 of a snap spring 49. The snap spring 49 is fastened to the valve piston 15 and acts with its snap arm 48 upon the piston 2. In the closed position which is illustrated, this action takes place radially and therefore has no effect on an axial displacement of the valve piston 15. If, however, the latter is moved in the opening direction, the snap arm 48 passes into the region of a ramp 50 of the piston 2 and can act with an increasing axial component of force on the valve piston 15 in the opening direction.

Figure 15:
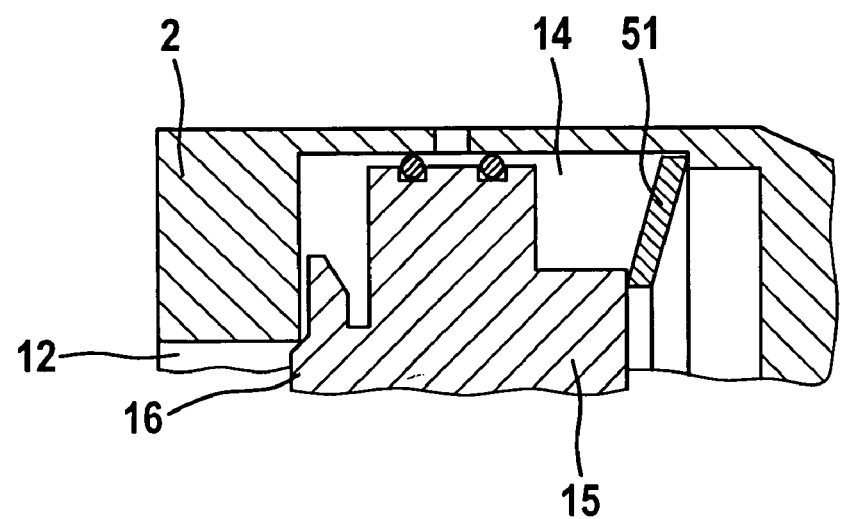
FIG. 15 shows a symbolic cross-sectional view of a fifteenth exemplary embodiment of a piston-cylinder unit.

In FIG. 15, the valve piston 15 is acted upon in the closing direction by radial spring arms of a disc-type compression spring 51, the force of which is degressive over the path of movement into the open position.

Figure 16:
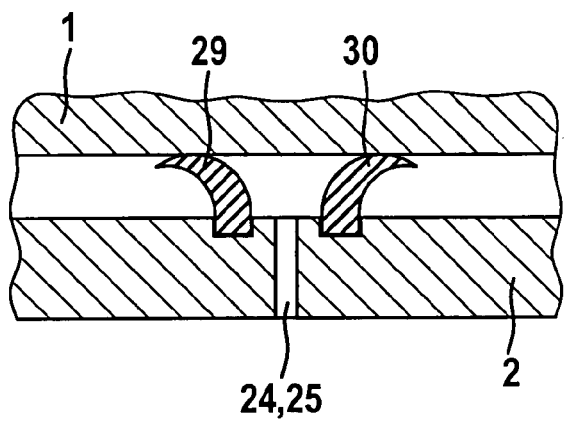
FIG. 16 shows a cross-sectional view of a first exemplary embodiment of a cut-out in the region of the annular seal of a piston-cylinder unit.

FIGS. 16 to 24 show the wide variety of designs of the valve flaps 26 and 27 of the nonreturn valves 36 and 37 and of the sealing ring 28, these three elements being designed as one component with the exception of the embodiment in FIG. 16.

Figure 17:
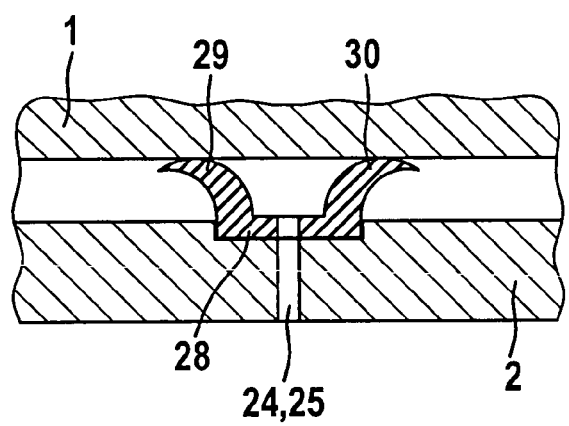
FIG. 17 shows a cross-section of a second exemplary embodiment of a cut-out in the region of the annular seal of a piston-cylinder unit.

In the exemplary embodiments of FIGS. 16 and 17, the connecting lines 24 and 25 are combined to form a line which opens into the region between two annular sealing lips 29 and 30, the free end regions of which are directed away from each other. These annular sealing lips 29 and 30 carry out both the function of the valve flaps and also the function of a sealing ring which separates the two working spaces 3 and 4 from each other.

Figure 18:
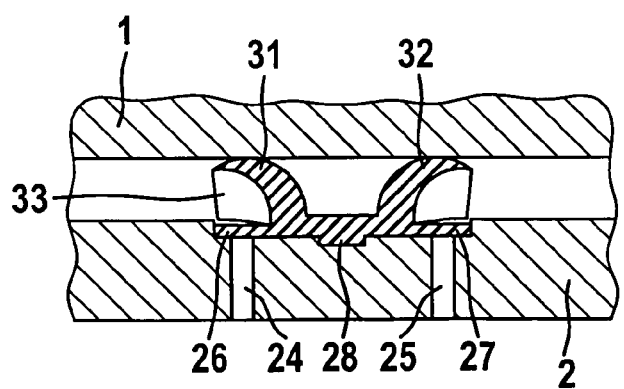
FIG. 18 shows a cross section of a third exemplary embodiment of a cut-out in the region of the annular seal of a piston-cylinder unit.
Figure 19:
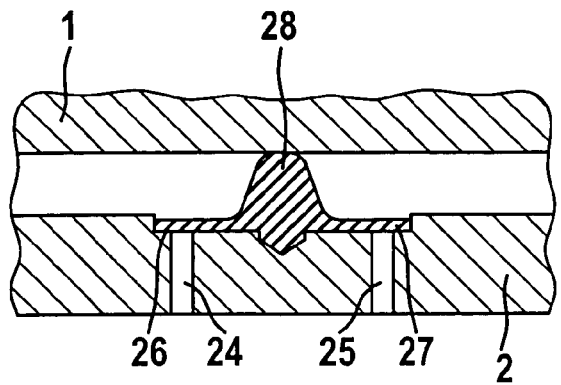
FIG. 19 shows a cross section of a fourth exemplary embodiment of a cut-out in the region of the annular seal of a piston-cylinder unit.
Figure 20:
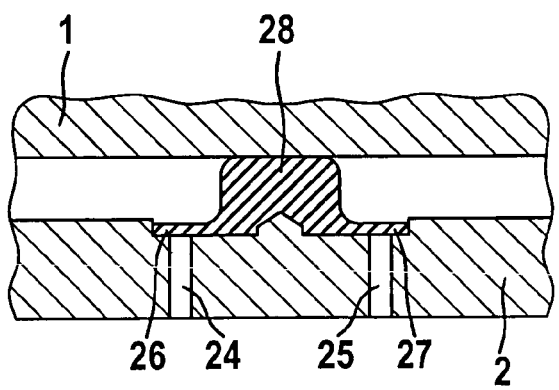
FIG. 20 shows a cross section of a fifth exemplary embodiment of a cut-out in the region of the annular seal of a piston-cylinder unit.
Figure 21:
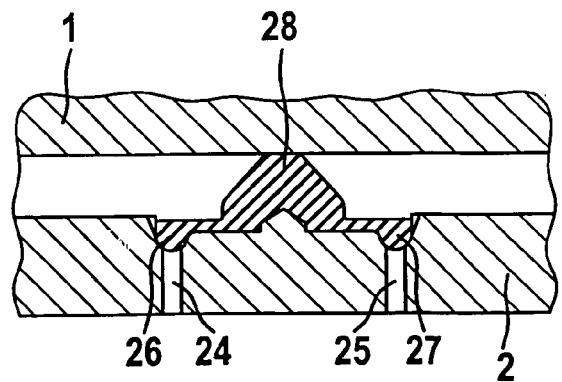
FIG. 21 shows a cross section of a sixth exemplary embodiment of a cut-out in the region of the annular seal of a piston-cylinder unit.
Figure 23:
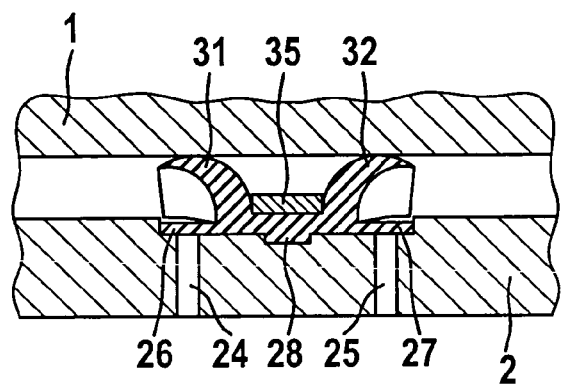
FIG. 23 shows a cross section of an eighth exemplary embodiment of a cut-out in the region of the annular seal of a piston-cylinder unit.

The sealing ring function is also carried out by the annular sealing lips 31 and 32 in FIGS. 18 and 23.

Figure 24:
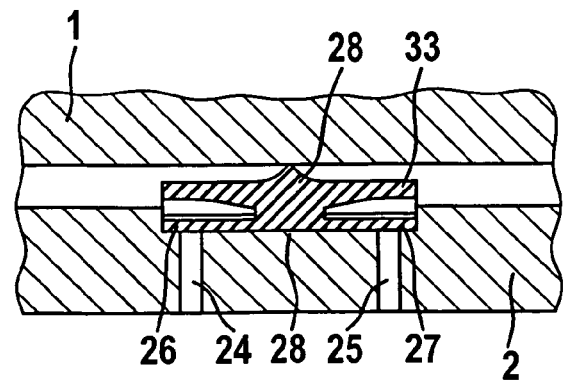
FIG. 24 shows a cross section of a ninth exemplary embodiment of a cut-out in the region of the annular seal of a piston-cylinder unit.

The exemplary embodiments of FIGS. 18 and 24 additionally have flow by-passes 33 designed as integral components of the sealing ring.

Figure 22:
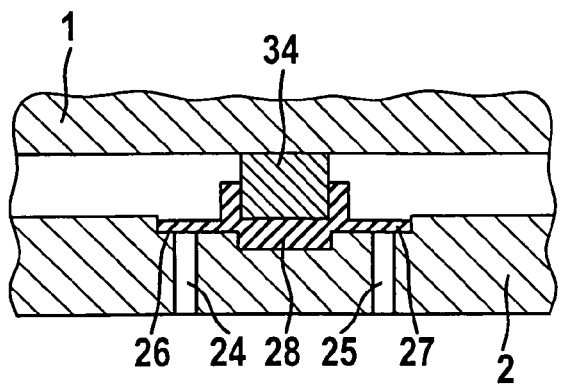
FIG. 22 shows a cross section of a seventh exemplary embodiment of a cut-out in the region of the annular seal of a piston-cylinder unit.

For easy displaceability, in FIG. 22 the elastic sealing ring 28 rests on the inner wall of the cylinder 1 via a sliding ring 34 inserted in a circumferential channel in the sealing ring.

To fix it in its fitted position, the sealing ring 28 is retained in FIG. 23 on the piston 2 by a clamping ring 35 which fits around it.

FIGS. 25 to 28 show closing elements 16 of valves which are designed as slide valves, a valve slide 52, which is loaded on the end side by the pressure of the working space 3, being able to move axially in the coaxial hole 12. An axial displacement of the valve slide 52 to the right causes a connection from the working space 3 via a hole 53 to the connecting line 21 (not illustrated) to be opened.

Figure 25:
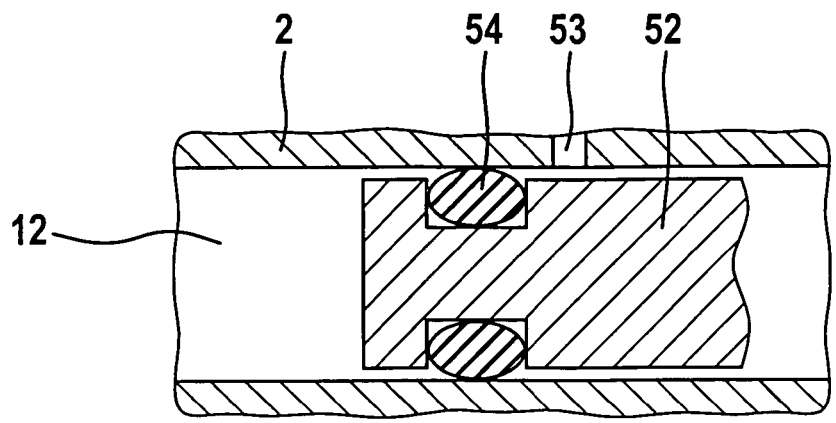
FIG. 25 shows a cross section of a first exemplary embodiment of a closing element of a valve, which opens under pressure, of a piston-cylinder unit.
Figure 26:
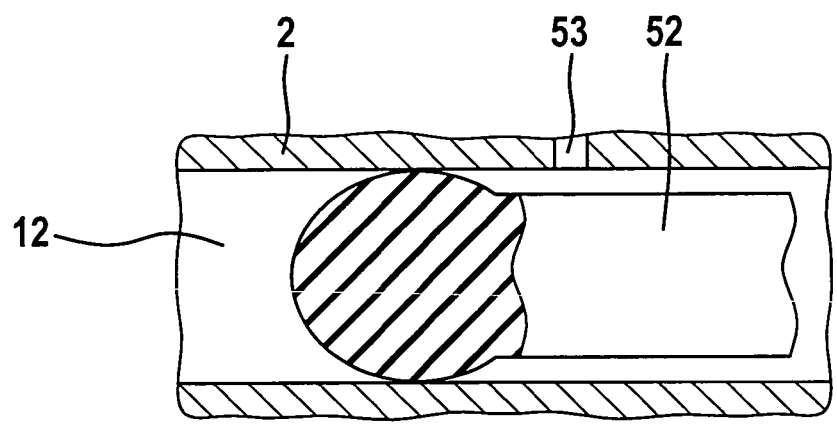
FIG. 26 shows a cross section of a second exemplary embodiment of a closing element of a valve, which opens under pressure, of a piston-cylinder unit.
Figure 27:
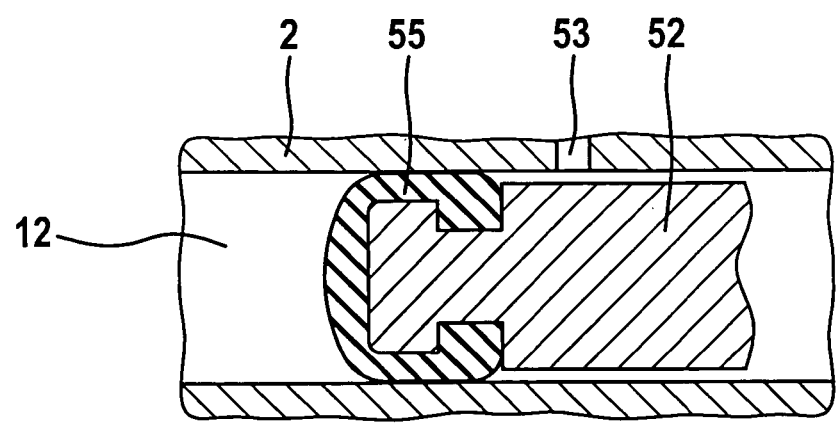
FIG. 27 shows a cross section of a third exemplary embodiment of a closing element of a valve, which opens under pressure, of a piston-cylinder unit.
Figure 28:
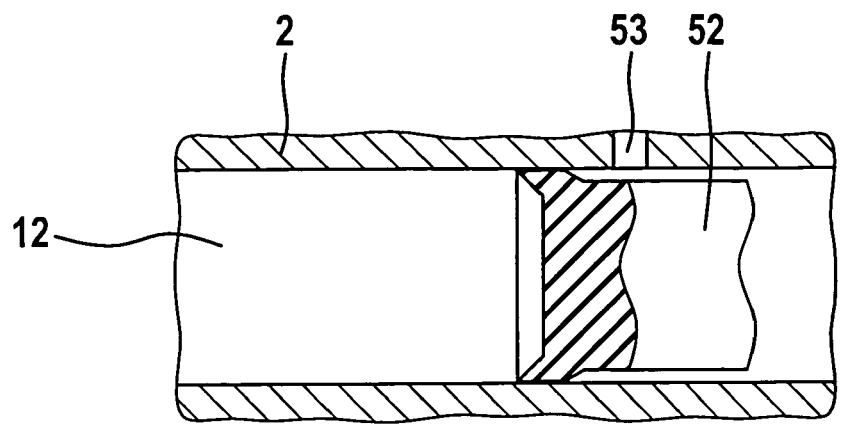
FIG. 28 shows a cross section of a fourth exemplary embodiment of a closing element of a valve, which opens under pressure, of a piston-cylinder unit.

In order to seal the valve slide 52 in the coaxial hole 12, in FIG. 25 the valve slide 52 is provided with an annular seal 54 and in FIG. 27 with a sealing cap 55 and in FIGS. 26 and 28 is produced at its free end completely from an elastomer.

Figure 29:
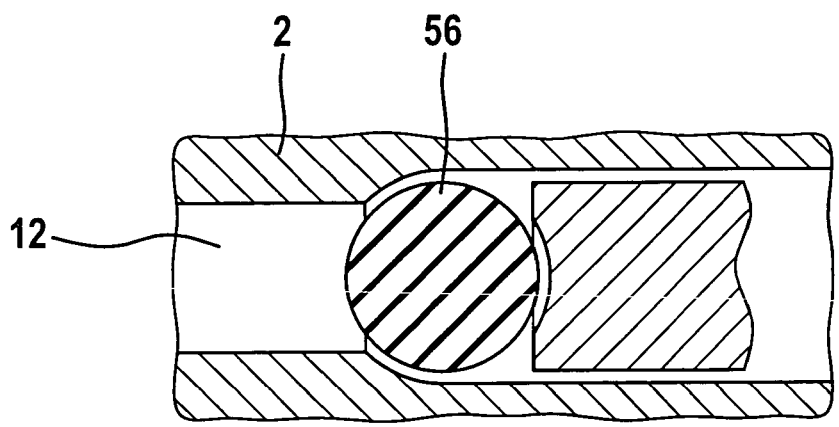
FIG. 29 shows a cross section of a fifth exemplary embodiment of a closing element of a valve, which opens under pressure, of a piston-cylinder unit.

Exemplary embodiments 29 to 33 show closing elements 16 of seat valves. In this case, in FIG. 29 an elastomeric valve ball 56 can be pressed against the valve seat.

Figure 30:
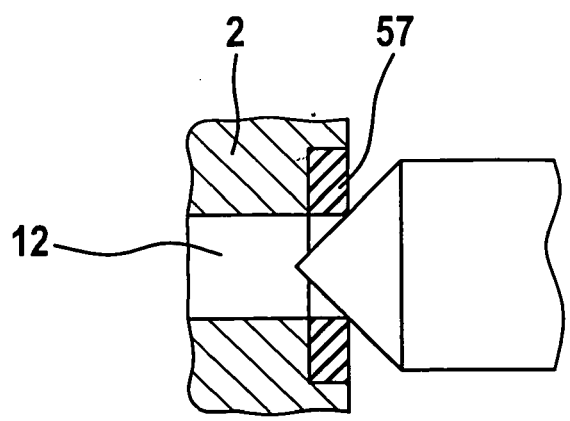
FIG. 30 shows a cross section of a sixth exemplary embodiment of a closing element of a valve, which opens under pressure, of a piston-cylinder unit.

In FIG. 30, the valve seat is formed by an elastomer ring 57 surrounding the mouth of the coaxial hole 12.

Figure 31:
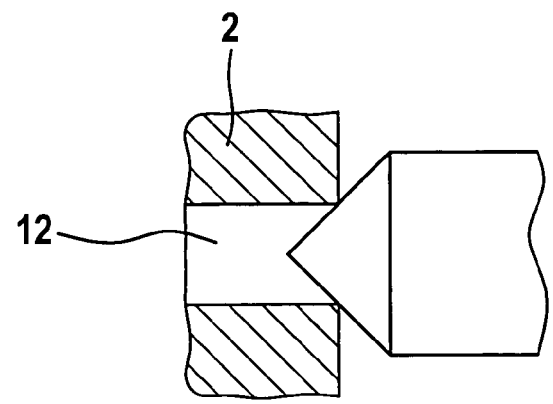
FIG. 31 shows a cross section of a seventh exemplary embodiment of a closing element of a valve, which opens under pressure, of a piston-cylinder unit.

FIG. 31 corresponds to the embodiment in FIG. 1.

Figure 32:
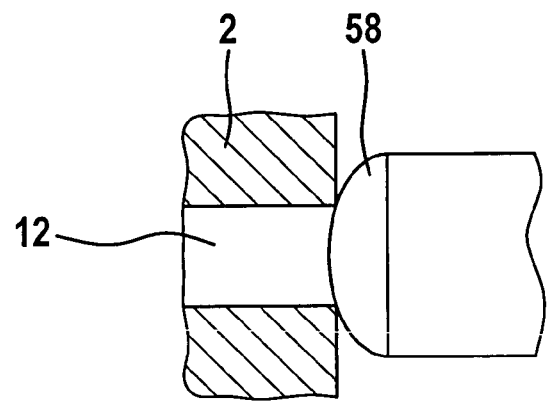
FIG. 32 shows a cross section of an eighth exemplary embodiment of a closing element of a valve, which opens under pressure, of a piston-cylinder unit.
Figure 33:
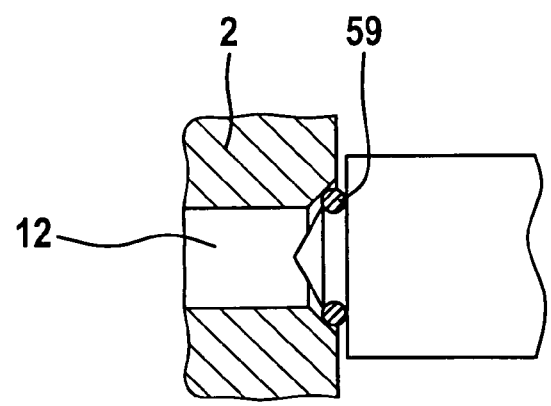
FIG. 33 shows a cross section of a ninth exemplary embodiment of a closing element of a valve, which opens under pressure, of a piston-cylinder unit.

In FIG. 32, the closing element 16 is provided on the end side with an elastomer cap 58, and in FIG. 33 the closing element 16 bears a sealing ring 59 on its end side.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A piston cylinder unit comprising:
a closed cylinder having an end wall;
a piston rod guided through said end wall;
a piston fixed to said piston rod for axial displacement in said cylinder, said piston dividing said cylinder into a working space surrounding the piston rod and a working space away from the piston rod;
an annular seal between said piston and said cylinder;
a volume equalizing space in said piston;
a first valve which can be opened under pressure to admit fluid from said working space away from said piston rod to said volume equalizing space;
a second valve which can be opened under pressure to admit fluid from said working space surrounding said piston rod to said volume equalizing space;
at least one of said first and second valves comprising:
a valve chamber in said piston and having a mouth opening into a respective one of said working spaces;
a valve piston sealingly and displaceably mounted within said valve chamber and biased towards said mouth by a closing force; and
a closing element coupled to said valve piston and extending between said valve piston and said mouth, said closing element being configured to close said mouth and displaceable with said valve piston from said mouth when pressure in said respective working space exceeds said closing force,
wherein said at least one of said first and second valves is configured as a non-return valve providing flow communication between said respective working space and said volume equalizing space upon opening said mouth;
a first non-return valve which can admit fluid from said volume equalizing space to said working space away from said piston rod; and
a second non-return valve which can admit fluid from said volume equalizing space to said working space surrounding said piston rod.

2. The piston-cylinder unit of claim 1, wherein said volume equalizing chamber has a fluid capacity which increases under pressure loading and decreases under pressure relief.

3. The piston-cylinder unit of claim 2, further comprising a volume-equalizing element in said volume-equalizing chamber, said element having a volume which decreases under pressure loading and increases under pressure relief.

4. The piston-cylinder unit of claim 3, wherein said volume equalizing element has an elastomeric wall enclosing a space filled with a gas.

5. The piston-cylinder unit of claim 1, wherein said at least one of said first and second valves which can be opened under pressure comprises a helical compression spring or a cup-type compression spring.

6. The piston-cylinder unit of claim 1, wherein said at least one of said first and second valves which can be opened under pressure is a seat valve.

7. The piston-cylinder unit of claim 1, wherein said at least one of said first and second valves which can be opened under pressure is a slide valve.

8. The piston-cylinder unit of claim 1, wherein said closing force is produced by a spring.

9. The piston-cylinder unit of claim 8, wherein said spring comprises one or more spring arms supported on the piston and applying a force which is degressive so that said closing element is subject to less force in a closing direction as said closing element moves in an opening direction.

10. The piston-cylinder unit of claim 1, wherein one of said closing element and said valve piston of said at least one of said first and second valves is loaded in the closing direction by magnetic forces.

11. The piston-cylinder unit of claim 10, wherein said at least one of said first and second valves which can be opened under pressure comprises a permanent magnet on one of said valve piston and said piston and a ferromagnetic component on the other of said valve piston and said piston.

12. The piston-cylinder unit of claim 1, wherein said at least one of said first and second valves which can be opened under pressure is retained in an open position by a retaining force which is smaller than said closing force, said retaining force added to said pressure being larger than said closing force.

13. The piston-cylinder unit of claim 12, further comprising a latching element on one of said valve piston and said piston, and a latch on the other of said valve piston and said piston, said latching element and said latch providing said retaining force.

14. The piston-cylinder unit of claim 12, further comprising a snap spring arranged on the valve piston, said snap spring having a snap arm which is contact with said piston without any substantial axial force in the closed position, and cooperates with said piston to provide said retaining force in the open position.

15. The piston-cylinder unit of claim 1, further comprising at least one permanent magnet arranged on said valve piston and at least one permanent magnet arranged on said piston, said permanent magnets being arranged to provide said closing force when said valve piston is in a closed position and said retaining force when said valve piston is in an open position.

16. The piston-cylinder unit of claim 1, wherein said annular seal is designed to form said first and second non-return valves.

17. The piston cylinder unit of claim 16, wherein said annular seal comprises two axially spaced annular sealing lips which bear against said cylinder and form a space therebetween, said piston comprising a connecting line which connects said volume equalizing space to said space between said annular sealing lips.

18. The piston-cylinder unit of claim 16, wherein said annular seal comprises two axially spaced valve flaps separated by a sealing ring which bears elastically against said cylinder, said piston comprising a connecting line which opens radially on said piston and leads to the volume-equalizing chamber, said valve flaps closing said connecting line.

* * * * *